No. 706,426. Patented Aug. 5, 1902.
T. J. LANGSTON.
FOLDING BASKET.
(Application filed Mar. 24, 1902.)
(No Model.)
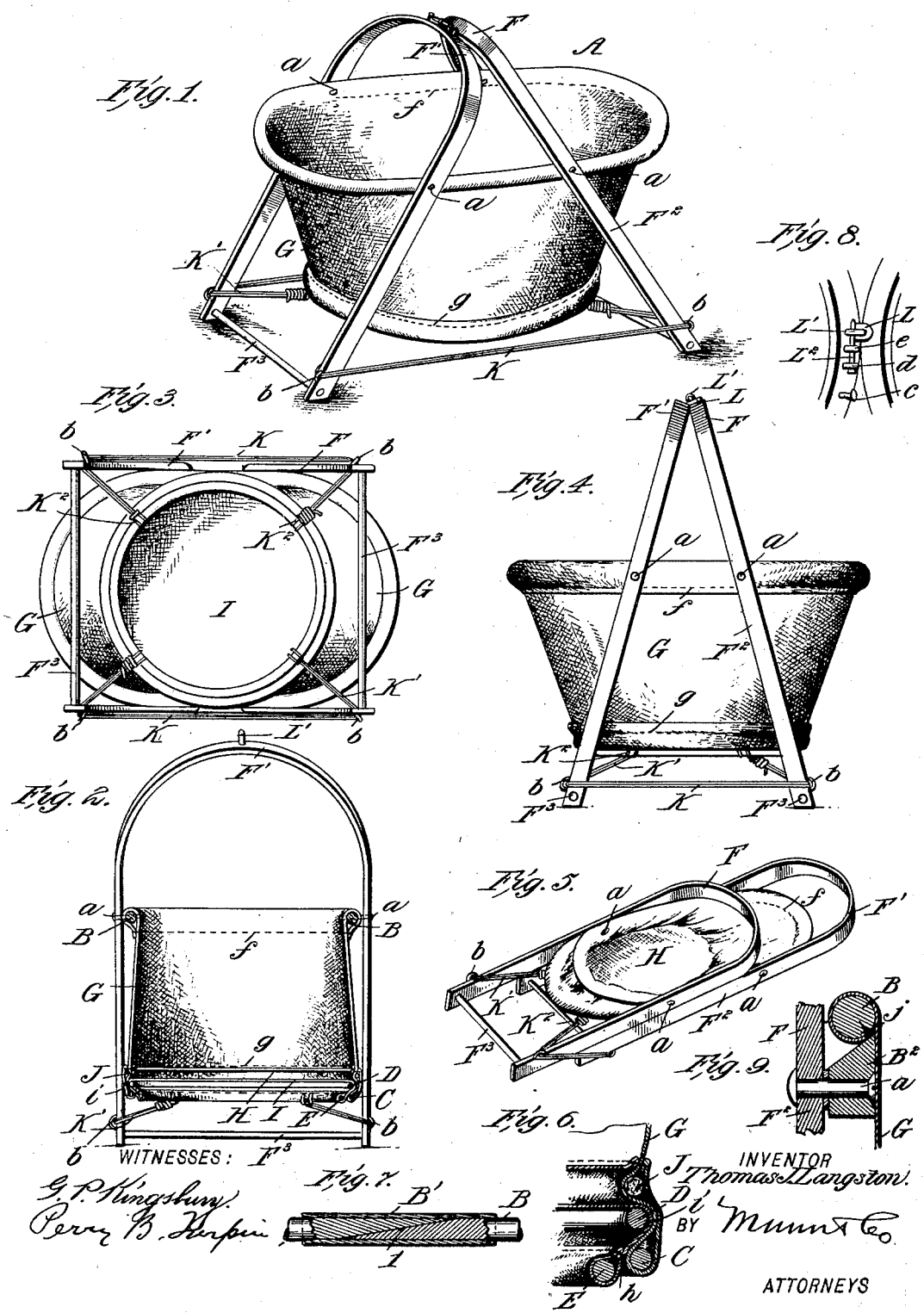
WITNESSES:
G. P. Kingsbury
Perry B. Turpin
INVENTOR
Thomas J. Langston
BY Munn & Co.
ATTORNEYS
THE NORRIS PETERS CO., PHOTO-LITHO., WASHINGTON, D. C.

UNITED STATES PATENT OFFICE.

THOMAS JUDSON LANGSTON, OF JOHNSTON, SOUTH CAROLINA.

FOLDING BASKET.

SPECIFICATION forming part of Letters Patent No. 706,426, dated August 5, 1902.

Application filed March 24, 1902. Serial No. 99,683. (No model.)

*To all whom it may concern:*

Be it known that I, THOMAS JUDSON LANGSTON, a citizen of the United States, and a resident of Johnston, in the county of Edgefield and State of South Carolina, have made certain new and useful Improvements in Folding Baskets, of which the following is a specification.

My invention is an improvement in baskets, and especially in that class of baskets which have a collapsible body portion and a folding handle-frame; and the invention consists in certain novel constructions and combinations of parts, as will be hereinafter described and claimed.

In the drawings, Figure 1 is a perspective view of my basket ready for use. Fig. 2 is a cross-section thereof. Fig. 3 is a bottom plan view of the basket. Fig. 4 is a side elevation of the basket. Fig. 5 is a perspective view showing the basket collapsed or folded. Fig. 6 is a detail sectional view of the bottom portion of the basket. Fig. 7 is a detail view showing the sleeve for uniting the ends of one of the frames of the basket. Fig. 8 is a detail top view of a portion of the handles, showing the latch for securing the same together. Fig. 9 is a detail sectional view of a supporting-frame that may be used when desired.

The basket has its body A constructed with the upper rim-frame B and the lower frames C, D, and E, the flexible covering G, and the flexible bottoms H and I. The flexible removable or false bottom I underlies the flexible bottom H, as shown in Fig. 2. The flexible bottom H is stitched to the flexible covering G above the lower flexible bottom I, and the flexible false bottom I is passed over the free frame D and is attached at its edges to a rim-frame E, preferably by a hem or fold stitched at $h$. (Shown in Fig. 6.)

The body portion G is provided at top and bottom with rim-frames B and C and with a draw-string J, which may be tightened to press the walls of the body G inwardly, and thus lessen strain on seams and prevent the fruit or the like dropped in the basket from being injured by contact with frame D or the parts immediately overlying the same. The rim-frames are preferably secured in place by hems or folds, the lower rim-frame C and the draw-string J being contained in the same fold, with a row of stitching $i$ between them to keep them in their respective positions and to permit the false bottom to be more easily put in place.

The frame B may have its ends brought together and beveled at 1, as shown in Fig. 7, and be incased at the joint by a sleeve B'. Where desired, a support-frame $B^2$ may be used to pivot the handle-frames to.

The guides $b$, near the lower ends of the side bars of handle-frames, may be open at the bottom to release the tension-lines K, so the flexible body and tension-lines may be removed from handle-frames and supporting-frame $B^2$. The flexible body G may be secured to the rim-frame B with tacks. (Shown in Fig. 9.)

The handle is composed of two bow-frames F, whose crowns F' may be brought together, as shown in Figs. 1 and 4, and whose side arms $F^2$ are pivoted at $a$ to the support-frame $B^2$ or preferably to the top rim-frame B, while their lower ends extend thence below the bottom of the basket and form legs upon which to support the latter. The lower ends of the handle-frames are connected with the bottom of the body by means of tension-lines K, of wire or cord, preferably of wire, which pass through guides $b$, near the lower ends of the opposite arms $F^2$, on the same side of the basket-body, and thence inwardly at K', with their ends secured at $K^2$ to the rim E of the false bottom I. If the false bottom I is not used, tension-lines should be connected to the bottom rim C of the basket-body. By this means when the handle-frames are adjusted to the position shown in Figs. 1 and 4 the lines or connections K brace the opposite handle-frames at their lower ends and also serve to stretch and secure all parts of the basket-body in position, the opposite legs of each handle-frame F being braced apart by means of the cross-bars $F^3$.

Latch devices are provided at the crowns F' of the handle-frames and consist, preferably, of a staple L on one frame, through which projects a staple L' on the other frame, a bolt $L^2$ being arranged in guides to slide through the staple L' when the latter has been inserted through the staple L, as will be understood from Fig. 8.

It will be noticed that in the construction shown the handle-frames are pivoted directly to the body of the basket or to a support-frame with basket-body supported inside the same and have their lower ends connected with the bottom of the basket and extended to form legs.

In Figs. 1, 3, and 4 the basket is shown adjusted for use. To adjust it to collapsed position, the fastening L, L', and L² should be released, when the parts can be folded to the position shown in Fig. 5, in which the handle-frames F lie in planes approximating that of the upper rim-frame B, as will be best understood on reference to said Fig. 5.

Having thus described my invention, what I claim as new, and desire to secure by Letters Patent, is—

1. The improvement in baskets herein described consisting of, the basket-body having top and bottom rim-frames, a flexible separable bottom, a free frame for said bottom having its edges secured to a rim-frame with said separable bottom adjusted inside the flexible body above its bottom rim-frame, a draw-string around the flexible body above said separable bottom, a stitched-in flexible bottom above said removable bottom, handle-frames having their side bars pivoted to the top rim-frame of basket-body and extending below the bottom of said body forming legs, cross-braces for said legs, guides on the legs for tension-lines, the tension-lines carried in and through said guides and secured at their ends to the rim-frame of the flexible bottom, and a latching device for the handle-frame consisting of a staple on one frame, a coöperating staple on the other frame, and a bolt for locking the staples together, substantially as described.

2. The combination of a flexible collapsible basket-body having top and bottom rim-frames, a removable bottom over and under a free frame with the edges of said removable bottom secured to a rim-frame, a draw-string around the flexible body above the flexible removable bottom, the handle-frames having their side bars pivoted to the top rim-frame of the basket-body and extending below the bottom of said body and forming legs, braces for said legs, guides on the legs for tension-lines, the tension-lines extending through said guides and secured at their ends to the bottom rim, substantially as described.

3. In a basket the combination of a flexible body having top and bottom rim-frames, a stitched-in flexible bottom above the bottom rim-frame, the handle-frames having their side bars pivoted to the top rim-frame of the basket-body and extending below the bottom forming legs, braces for said legs with guides for tension-lines, and tension-lines passing through said guides and secured at their ends to the bottom rim of the basket-body substantially as set forth.

4. A flexible basket-body having a top rim-frame, a pair of bow handle-frames having their side bars pivoted to said rim-frame and extending below the basket-body forming legs therefor, straps, or lines, connecting the legs and bottom of flexible basket-body, and a latching device for the crowns of the bow-handles consisting of a bolt, guides therefor and interlocking staples arranged to bolt the basket in open position, substantially as described.

5. The combination of a flexible basket-body, the rim-frames at the top and bottom thereof, a stitched-in flexible bottom above lower frame, handle-frames having their side bars pivoted to upper frame of basket-body, and extending at their lower ends below the basket-body forming legs and the latching devices for the crowns of the handle-frames substantially as described.

6. In a basket the combination with the basket-body and the handle-frames having their side bars pivoted to the basket-body and extending below the same, and provided with guides for line connections and the line connections passing through said guides and connected at their ends to the basket-body, substantially as set forth.

7. A flexible basket-body provided with a flexible bottom, and below the same with a flexible false bottom, substantially as set forth.

8. The flexible basket-body provided with a flexible removable bottom and with a frame by which the bottom is held in said body substantially as set forth.

9. The combination with a flexible basket-body having a flexible bottom, of a draw-string applied around the body adjacent to the bottom, substantially as set forth.

10. The combination of a flexible basket-body, the rim-frame at the upper and lower ends thereof, a flexible false bottom above the lower frame and a draw-string applied to the body above the false bottom, substantially as described.

11. The combination of a flexible basket-body, the rim-frames at the upper and lower ends thereof and a flexible stitched-in bottom between the upper and lower frames, and the false bottom between the stitched-in bottom and the lower free frame, substantially as set forth.

12. The combination of a flexible basket-body, having a rim-frame and a support-frame pivoted to the side bars of bow handle-frames, with said side bars of handle-frames extending below the bottom of flexible basket-body forming legs therefor, line connections between the legs and bottom of flexible basket-body, and a latching device for the crowns of the bow-handles, substantially as described.

13. The improvement in baskets herein described consisting of the basket-body having the top frame and the bottom frame and provided with the flexible bottom and with a draw-string and a casing therefor and having an extension below said bottom, the handle-frames having their side bars pivoted to the body of the basket and extending below the bottom of said body to form legs and provided with guides for the line connections, and the line connections carried through said guides and secured at their ends to the body of the basket, substantially as set forth.

14. The combination of the flexible body having a flexible bottom and an extension below the same, and a lower rim-frame and bracing or false bottom operating in connection with said lower extension substantially as set forth.

15. The combination of the flexible basket-body having a bottom and below the same an extension and the lower rim-frame held in said extension, the free frame D in said extension above the lower and rim frame, and the false bottom passed over said free frame and secured substantially as set forth.

16. The combination with the flexible basket-body having a flexible bottom and an extension below the said bottom, the rim-frame held in said extension, and the flexible bracing or false bottom held to said rim-frame, substantially as and for the purposes set forth.

THOMAS JUDSON LANGSTON.

Witnesses:
E. G. MORGAN,
J. G. MORGAN.